(12) United States Patent
Wu

(10) Patent No.: US 11,416,718 B2
(45) Date of Patent: Aug. 16, 2022

(54) ITEM IDENTIFICATION METHOD, DEVICE AND SYSTEM BASED ON VISION AND GRAVITY SENSING

(71) Applicant: Yi Tunnel (Beijing) Technology Co., Ltd., Beijing (CN)

(72) Inventor: Yili Wu, Beijing (CN)

(73) Assignee: Yi Tunnel (Beijing) Technology Co., Ltd., Beijing (CN)

( * ) Notice: Subject to any disclaimer, the term of this patent is extended or adjusted under 35 U.S.C. 154(b) by 327 days.

(21) Appl. No.: 16/757,628

(22) PCT Filed: Mar. 18, 2020

(86) PCT No.: PCT/CN2020/079896
§ 371 (c)(1),
(2) Date: Apr. 20, 2020

(87) PCT Pub. No.: WO2021/042698
PCT Pub. Date: Mar. 11, 2021

(65) Prior Publication Data
US 2021/0406617 A1    Dec. 30, 2021

(30) Foreign Application Priority Data

Sep. 6, 2019   (CN) .......................... 201910840293.7
Dec. 23, 2019  (CN) .......................... 201911337957.4

(51) Int. Cl.
*G06K 9/62*     (2022.01)
*G06T 7/194*    (2017.01)
(Continued)

(52) U.S. Cl.
CPC ......... *G06K 9/6288* (2013.01); *G01G 19/414* (2013.01); *G06Q 10/087* (2013.01);
(Continued)

(58) Field of Classification Search
CPC ............ G06K 9/6288; G06K 17/0029; G01G 19/414; G01G 19/00; G06Q 10/087;
(Continued)

(56) References Cited

U.S. PATENT DOCUMENTS 10,163,149 B1 * 12/2018 Famularo ............. G06Q 10/087
10,242,393 B1 *  3/2019 Kumar ............... G06Q 30/0633
(Continued)

FOREIGN PATENT DOCUMENTS

| CN | 108335408 A | 7/2018 |
|---|---|---|
| CN | 109649915 A | 4/2019 |
| CN | 109886169 A | 6/2019 |

OTHER PUBLICATIONS

SIPO, International Search Report issued in IA Application No. PCT/CN2020/079896, dated Jun. 22, 2020.

*Primary Examiner* — Aaron W Carter
(74) *Attorney, Agent, or Firm* — United IP Counselors, LLC

(57) ABSTRACT

The present invention belongs to the technical field of computer, and discloses an item identification method and device based on vision and gravity sensing. The method comprises: identifying a collected item image, and acquiring a plurality of visual identification results corresponding to N times of pick-up and put-back behaviors, wherein each visual identification result corresponds to one time of pick-up and put-back behavior; acquiring a weight identification result corresponding to each weight change of M times of weight changes of items supported on a support; judging whether a total weight change value corresponding to M times of weight changes is consistent with the total weight value of the pick-up and put-back items corresponding to N times of pick-up and put-back behaviors or not; and if not, perfecting each visual identification result according to the M weight identification results to obtain the sum of identi- (Continued)

fication items corresponding to N times of pick-up and put-back behaviors. The device comprises a visual identification module, a weight identification module, a judgment module and an obtaining module. Through the technical solution, the accuracy of the item identification is improved.

10 Claims, 5 Drawing Sheets

(51) Int. Cl.
    *G06V 20/52*     (2022.01)
    *G06V 40/20*     (2022.01)
    *G01G 19/414*     (2006.01)
    *G06Q 10/08*     (2012.01)

(52) U.S. Cl.
    CPC ............. *G06T 7/194* (2017.01); *G06V 20/52* (2022.01); *G06V 40/20* (2022.01); *G06T 2207/30232* (2013.01)

(58) Field of Classification Search
    CPC ......... G06T 7/194; G06T 2207/30232; G06V 20/52; G06V 40/20; G06V 40/10; G06N 3/0454
    See application file for complete search history.

(56) References Cited

U.S. PATENT DOCUMENTS

| | | | |
|---|---|---|---|
| 10,262,293 B1* | 4/2019 | Prater | G06Q 10/087 |
| 10,318,917 B1* | 6/2019 | Goldstein | G06Q 20/203 |
| 10,332,066 B1* | 6/2019 | Palaniappan | G01G 19/42 |
| 10,339,493 B1* | 7/2019 | Famularo | G06V 10/751 |
| 10,515,309 B1* | 12/2019 | McNamara | G06Q 10/087 |
| 10,657,411 B1* | 5/2020 | Manyam | G06V 20/52 |
| 10,664,795 B1* | 5/2020 | Worley | G06Q 10/087 |
| 10,713,614 B1* | 7/2020 | Manyam | G06Q 10/087 |
| 10,739,551 B1* | 8/2020 | Kashyap | G02B 7/09 |
| 10,902,237 B1* | 1/2021 | Aggarwal | G06V 10/24 |
| 10,943,465 B1* | 3/2021 | Le | H04N 17/002 |
| 11,030,541 B1* | 6/2021 | Camp | G06Q 10/087 |
| 11,042,836 B1* | 6/2021 | Goldstein | G06Q 10/087 |
| 11,085,809 B1* | 8/2021 | Franklin | G01G 3/1402 |
| 11,087,271 B1* | 8/2021 | Guan | G06Q 10/087 |
| 11,117,744 B1* | 9/2021 | Medioni | G06Q 10/087 |
| 11,238,401 B1* | 2/2022 | Guan | G06F 3/0481 |
| 11,270,546 B1* | 3/2022 | Mosman | B65D 83/08 |
| 11,301,684 B1* | 4/2022 | Kumar | G06V 20/46 |
| 2018/0285902 A1* | 10/2018 | Nazarian | G06Q 10/087 |
| 2019/0035239 A1* | 1/2019 | Elliott | G08B 13/19697 |
| 2019/0130377 A1* | 5/2019 | Ding | G06Q 20/208 |
| 2019/0325689 A1* | 10/2019 | Wu | G06Q 30/0633 |
| 2019/0333039 A1* | 10/2019 | Glaser | G06Q 20/201 |
| 2020/0104593 A1* | 4/2020 | Zucker | G06V 20/10 |
| 2020/0250949 A1* | 8/2020 | Bao | G08B 13/2454 |
| 2020/0258069 A1* | 8/2020 | Ma | G06Q 20/208 |
| 2020/0265494 A1* | 8/2020 | Glaser | G06Q 30/0627 |
| 2021/0182921 A1* | 6/2021 | Onkels | G06Q 30/06 |
| 2021/0199489 A1* | 7/2021 | Zhu | G07G 1/0063 |
| 2021/0224773 A1* | 7/2021 | Fazekas | G07G 1/0009 |
| 2021/0279784 A1* | 9/2021 | Wu | G06Q 30/0283 |
| 2021/0398097 A1* | 12/2021 | Wu | G07G 1/0063 |
| 2021/0406617 A1* | 12/2021 | Wu | G06V 20/52 |
| 2022/0027840 A1* | 1/2022 | Li | G06Q 10/087 |
| 2022/0058603 A1* | 2/2022 | Gotanda | G06Q 20/18 |
| 2022/0067688 A1* | 3/2022 | Patel | G06K 9/6289 |

* cited by examiner

ITEM IDENTIFICATION METHOD, DEVICE AND SYSTEM BASED ON VISION AND GRAVITY SENSING

RELATED APPLICATIONS

This application is the National Stage application under 35 U.S.C. 371 of PCT International Application No. PCT/CN2020/079896, filed on Mar. 18, 2020, which claims priority from Chinese Patent Application No. CN201911337957.4, filed on Dec. 23, 2019, and Chinese Patent Application No. CN201910840293.7, filed on Sep. 6, 2019, the contents of which are hereby incorporated by reference in their entirety.

FIELD OF INVENTION

The present invention belongs to the technical field of computer, and particularly relates to an item identification method, device and system based on vision and gravity sensing.

BACKGROUND OF THE INVENTION

With the development of science and technology, unmanned sales are more and more favored by customers.

In the prior art, some unmanned items have adopted only gravity solution, but after using this solution, it is found that the items with the same weight cannot be distinguished. Some unmanned items have adopted only visual identification solution, but after using this solution, it is found that multiple pieces cannot be accurately identified due to mutual occlusion of the items, resulting in poor user's experience and low accuracy of item identification.

SUMMARY

In order to solve the problems in the prior art, in one aspect, the present invention provides an item identification method based on vision and gravity sensing, which comprises: identifying a collected item image, and acquiring a plurality of visual identification results corresponding to N times of pick-up and put-back behaviors, wherein each visual identification result corresponds to one time of pick-up and put-back behavior, the visual identification result includes a pick-up and put-back action, a pick-up and put-back item and pick-up and put-back time, and N is a natural number; acquiring a weight identification result corresponding to each weight change of M times of weight changes of items supported on a support, wherein the weight identification result comprises a weight change value and weight change time, and M is a natural number; judging whether a total weight change value corresponding to M times of weight changes is consistent with the total weight value of the pick-up and put-back items corresponding to the N times of pick-up and put-back behaviors or not; and if not, perfecting each visual identification result according to the M weight identification results to obtain a sum of identification items corresponding to the N times of pick-up and put-back behaviors.

In another aspect, the present invention provides an item identification device based on vision and gravity sensing, which comprises: a visual identification (also called as vision identification) module used to identify a collected item image, and acquire a plurality of visual identification results corresponding to N times of pick-up and put-back behaviors, wherein each visual identification result corresponds to one time of pick-up and put-back behavior, the visual identification result includes a pick-up and put-back action, a pick-up and put-back item and pick-up and put-back time, and N is a natural number; a weight identification module used to acquire a weight identification result corresponding to each weight change of M times of weight changes of items supported on a support, wherein the weight identification result comprises a weight change value and weight change time, and M is a natural number; a judgment module used to judge whether a total weight change value corresponding to M times of weight changes is consistent with the total weight value of the pick-up and put-back items corresponding to the N times of pick-up and put-back behaviors or not; and an obtaining module used to perfect each visual identification result according to the M weight identification results to obtain a sum of identification items corresponding to the N times of pick-up and put-back behaviors if the result of the judgment is inconsistent.

Still in another aspect, the present invention provides an item identification system based on vision and gravity sensing, which comprises: an image collection device used to collect item images; a weighing device used to weigh the weight of a container for selling items; an item identification device connected with the image collection device and the weighing device, which is the above-mentioned item identification device.

Yet in another aspect, the present invention provides an item identification device based on vision and gravity sensing, which comprises: a memory and a processor. The processor is connected with the memory, and is configured to execute the above-mentioned item identification method on the basis of vision and gravity sensing based on the instructions stored in the memory.

Still in another aspect, the present invention provides a computer-readable storage medium having stored thereon a computer program which, when executed by a processor, implements the above-mentioned item identification method based on vision and gravity sensing.

The examples of the present invention have the following beneficial effects through the technical solution: the accuracy of item identification is greatly improved, and the user's experience can also be improved.

DETAILED DESCRIPTION OF THE EMBODIMENTS

In order to make objects, technical solutions and advantages of the present invention more apparent, the embodiments of the present invention will be further described in detail below in connection with the drawings.

Figure 1:
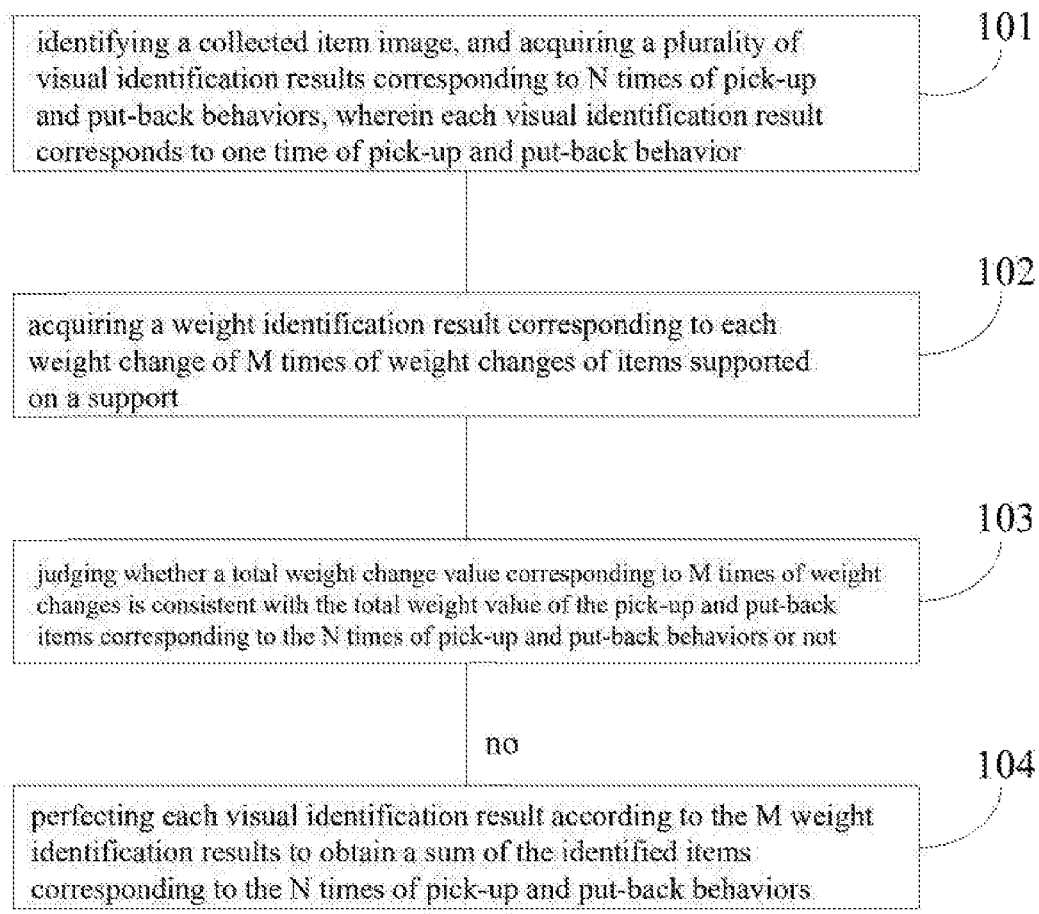
FIG. 1 is a schematic flowchart of an item identification method based on vision and gravity sensing provided in an example of the present invention.

With reference to FIG. 1, an example of present invention provides an item identification method based on vision and gravity sensing, which comprises the following steps:

Step 101, identifying a collected item image, and acquiring a plurality of visual identification results corresponding to N times of pick-up and put-back behaviors, wherein each visual identification result corresponds to one time of pick-up and put-back behavior.

In this step, the collection of item images can be accomplished by an image collection device, such as a camera. The image collection device is used for shooting the process of selecting the items by the user, so that the images of the user in the process can be acquired, the image collection device can be installed above and/or below the unmanned vending machine with the items or the shelf with the items, and the image collection device can also be installed on a door frame of the unmanned vending machine with a cabinet door. Identification of the item images may be accomplished by an identification model, such as a convolutional neural network model. The input is the collection item image, and the output can be a pick-up and put-back item (or a kind of item in an item image), that is, the items corresponding to a pick-up and put-back behavior of a user. The process of selecting items refers to a process of selecting items by a user in a shooting area of the image collection device, and generally comprises N times of the pick-up and put-back behaviors, wherein the pick-up and put-back behavior can be one time, N=1 at this time, also the pick-up and put-back behaviors can be multiple times, N≥2 at this time, and N is a natural number. The pick-up and put-back behavior is a pick-up behavior or a put-back behavior of the items, wherein the pick-up behavior indicates that a user wants to purchase the items, and the put-back behavior indicates that the user does not want to purchase the items. If the user has the items in the hand and gradually moves away from the support, identifying the behavior as the pick-up behavior of the items. And if the user has the items in the hand and gradually closes to the support, identifying the behavior as the put-back behavior of the items. The above-mentioned support is used to support the items to be sold. With regard to each pick-up and put-back behavior, the item image is collected and identified, and the visual identification result can be obtained: a pick-up and put-back item, a pick-up and put-back action and pick-up and put-back time. The pick-up and put-back item is the item corresponding to the pick-up and put-back action. The pick-up and put-back time is the execution time of the pick-up and put-back behavior, and any time when an image containing the item is collected can be taken as the pick-up and put-back time; if the pick-up and put-back behavior is the pick-up behavior, the time when the image containing the item is collected first in the pick-up and put-back behavior is taken as the pick-up and put-back time (also called the time when the item is picked up); and if the pick-up and put-back behavior is the put-back behavior, the time when the image containing the item is collected last in the pick-up and put-back behavior is taken as the pick-up and put-back time (also called the time when the item is put back).

In order to improve the accuracy of item identification, after the item image is collected and before identification, the item image is carried out background separation processing to obtain a foreground image of the item image, and identify the foreground image. The background separation technology can determine the background image by comparing the differences between the front and rear frame images, and then obtain the foreground image by using the background subtraction method.

Step 102, acquiring a weight identification result corresponding to each weight change of M times of weight changes of items supported on a support.

In this step, each pick-up and put-back action makes the items to be released from or placed on the support, thus causing the weight of the items supported on the support (i.e., the weight carried by the support) to change, such as decrease or increase, which can be collected by a weighing device, such as a gravity sensor (also called a weighing sensor). The gravity sensor can weigh the whole vending equipment so as to obtain a weight change value carried by the support, and the vending equipment can be an unmanned vending machine or a shelf; the gravity sensor can also weigh each layer of support frame of the vending equipment, so as to obtain the weight change value carried by the support, each layer of support frame is composed of a plurality of supports, and the weighing object of the gravity sensor is not limited in the example. In the execution process of N times of the pick-up and put-back behaviors, the weight changes occur for a plurality of times, the occurrence frequency can be one time, M=1 at this time, or can be multiple times, M≥2 at this time, and M is a natural number. Recording each weight change, and obtaining a weight identification result, wherein the result comprises: a weight change value and weight change time. The weight change time is the time at which the weight change occurs. If N of the pick-up and put-back behaviors are regarded as one purchase behavior, that is, each weight change occurring in the execution process of the purchase behavior is recorded. For example, when a user uses the vending machine to purchase items, the user carries out several times of item pick-up and put-back behaviors in front of the vending machine and then leaves the vending machine, and the several times of item pick-up and put-back behaviors performed by the user between the time when the user comes to the vending machine and the time when the user leaves the vending machine can be regarded as one purchase behavior; It is also possible that when a user purchases items in an unmanned supermarket, the user carries out several times of item pick-up and put-back behaviors in front of a certain shelf and then leaves the shelf, and the several times of item pick-up and put-back behaviors performed by the user between the time when the user comes to the shelf and the time when the user leaves the shelf can be regarded as one purchase behavior.

Step 103, judging whether a total weight change value corresponding to M times of weight changes is consistent with the total weight value of the pick-up and put-back items corresponding to the N times of pick-up and put-back behaviors or not.

In this step, N times of pick-up and put-back behaviors correspond to N of the visual identification results, and each visual identification result contains the pick-up and put-back items. After the pick-up and put-back items are identified, the weight value corresponding to the pick-up and put-back items can be obtained according to a preset weight table, which records the types and weight values of items to be sold on vending machine or shelf. The total weight value is the sum of the weight of the pick-up and put-back items in all visual identification results. When the pick-up and put-back behavior is the picked-up behavior, the weight of the pick-up and put-back items (also called the pick-up item) corresponding to the pick-up and put-back behavior increases the total weight value; when the pick-up and put-back behavior is the put-back behavior, the weight of the pick-up and put-back items (also called the put-back item) corresponding to the pick-up and put-back behavior reduces the total weight value, therefore, the positive value and the negative value are used to distinguish different pick-up and put-back behaviors. For example: a user has continuously taken the items A, B from the support and put them into a shopping cart (or virtual shopping cart or physical shopping cart) before a certain time, and the weight values of the items A and B are obtained to be A' and B', respectively by consulting the weight table, at which time the total weight value is (+A')+(+B'), and then the user takes the item B out of the shopping cart (or virtual shopping cart or physical shopping cart) and put it back on the support after the certain time, at which time the total weight value is (+A')+(+B')+(−B')=A'.

The weight of the whole selling equipment before the user does not perform the pick-up and put-back behavior is taken as an initial weight value, and the weight of the whole selling equipment after the user performs N times of pick-up and put-back behaviors is taken as an end weight value, and the weight change value can be obtained from making the difference between the two values. In other examples, it can be obtained by recording each weight change value, for example, the weight carried by the support frame composed of a plurality of support decreases, when the user takes the items from the support; the weight carried by the support frame increases, when the user puts the items back on the support, therefore, the positive value and the negative value are used to distinguish different weight changes. The total weight change value can be obtained by adding several weight change values. For example, two weight changes are detected before a certain time and the weight change values are +A' and +B', respectively, thus the total weight change value is (+A')+(+B'), and then the weight change is detected after the certain time and the weight change value is −B', thus the total weight change value at this time is (+A')+(+B')+(−B')=A'. During the execution process of N times of pick-up and put-back behaviors, several weight changes will occur. The number of weight changes sometimes is the same as the number of pick-up and put-back behaviors in one purchase behavior, and sometimes is different from the number of pick-up and put-back behaviors in one purchase behavior due to different circumstances and different users who execute pick-up and put-back behaviors. Both A 'and B' are positive numbers.

Then judging whether the total weight change value corresponding to M times of weight changes is consistent with the total weight value of the pick-up and put-back items corresponding to N times of pick-up and put-back behaviors or not, and if yes, taking the sum of N times of visual identification results as the sum of item identification results; if not, the visual identification result is required to be perfected so as to improve the identification accuracy. When comparing, it is possible to compare whether the two are exactly the same or whether the two are within an appropriate error range, which can be determined according to the geographical location or the item supplier, and the comparison in this example is not limited. The step is usually executed after the user completes a purchase behavior. For example, when the user purchases the items in the vending machine, after the user completes the purchase, and before the cabinet door of the vending machine is closed and the settlement information is sent, the execution is started; when the user purchases the items in unmanned store, the execution starts when the user leaves the shelf of the currently selected items or enters the exit area of the unmanned store or leaves the unmanned store and before settlement.

Step 104, if it is judged to be inconsistent, perfecting each visual identification result according to the M weight identification results to obtain a sum of the identified items corresponding to the N times of pick-up and put-back behaviors.

In general, a weight change is bound to be caused by the user executing the pick-up and put-back behavior, furthermore, the pick-up and put-back behavior may correspond to a visual identification result, and there may be no visual identification result in an occluded scene, at this time, the pick-up and put-back behavior has no visual identification result corresponding to it, therefore, the visual identification result can be perfected or verified by using the weight identification result, thus improving the identification accuracy of items.

In summary, in the example of the present invention, the visual identification result and the weight identification result are acquired, and when the total weight value corresponding to the visual identification result is inconsistent with the total weight change value corresponding to the weight identification result, the visual identification result is perfected according to the weight identification result, so as to obtain the sum of identification items purchased by the user, thereby improving the item identification accuracy.

Figure 2:
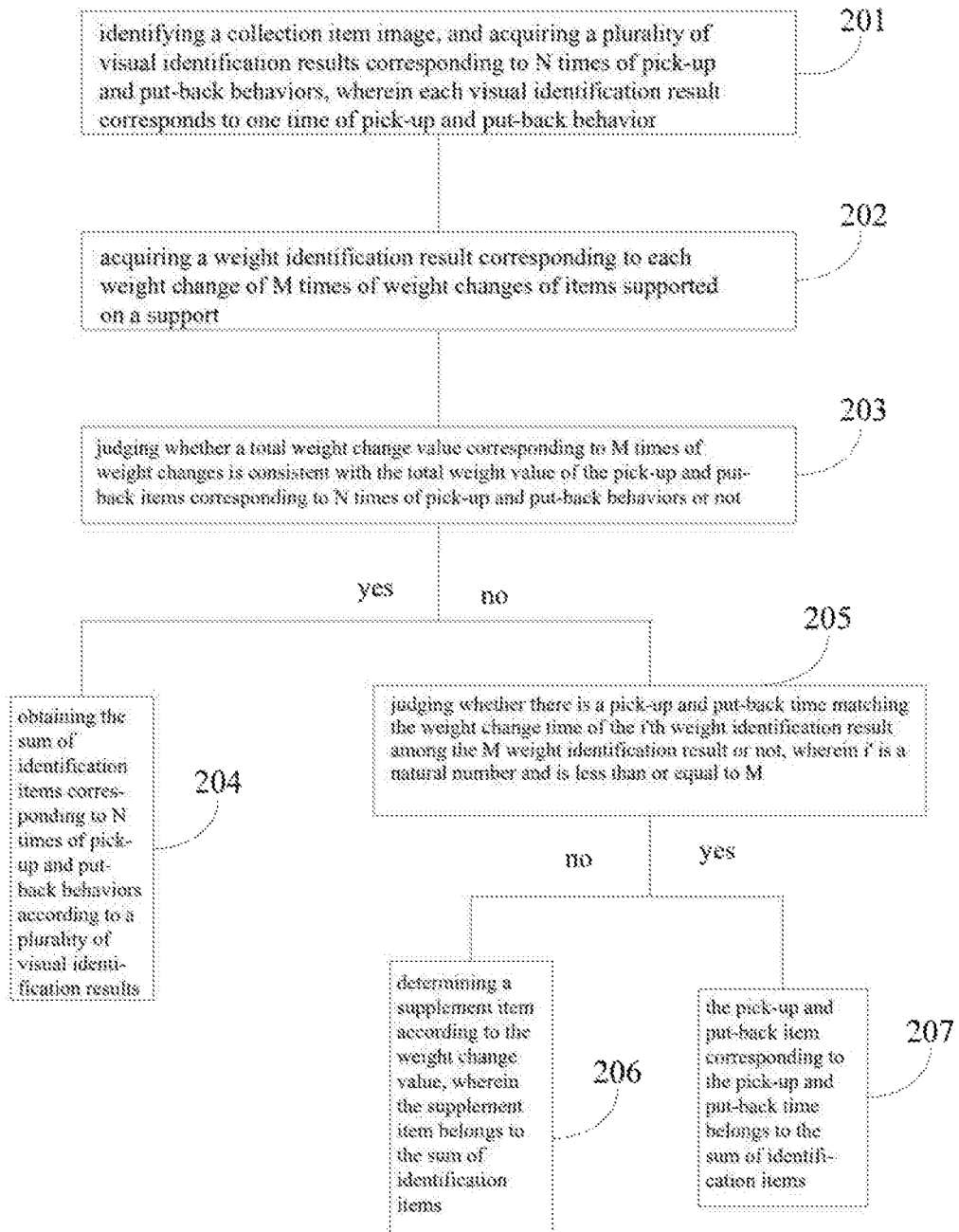
FIG. 2 is a schematic flowchart of an item identification method based on vision and gravity sensing provided in another example of the present invention.

With reference to FIG. 2, another example of the present invention provides an item identification method based on vision and gravity sensing, which comprises the following steps:

Step 201, identifying a collection item image, and acquiring a plurality of visual identification results corresponding to N times of pick-up and put-back behaviors, wherein each visual identification result corresponds to one time of pick-up and put-back behavior.

Step 202, acquiring a weight identification result corresponding to each weight change of M times of weight changes of items supported on a support.

Step 203, judging whether a total weight change value corresponding to M times of weight change is consistent with the total weight value of the pick-up and put-back items corresponding to N times of pick-up and put-back behaviors or not.

The descriptions of steps 201 to 203 refer to the related descriptions of the above examples, and are not repeated herein.

Step 204, if it is judged to be consistent, obtaining the sum of identification items corresponding to N times of pick-up and put-back behaviors according to a plurality of visual identification results.

In this step, if the total weight change value corresponding to M times of weight changes is consistent with the total weight value of the pick-up and put-back items corresponding to N times of pick-up and put-back behaviors, the visual identification is correct, and at this time, summing up the pick-up and put-back items of the plurality of visual identification results, and taking the sum as the sum of the identification items corresponding to N times of pick-up and put-back behaviors.

Step 205, if it is judged to be inconsistent, judging whether there is pick-up and put-back time matching the weight change time of the i'th weight identification result among the M weight identification results or not, wherein i' is a natural number and is less than or equal to M.

If a weight change occurs, it should be because the user execute the pick-up and put-back behavior, either pick-up behavior or put-back behavior, but whether the pick-up and put-back behavior is corresponding to one visual identification result or not, it would be different in different circumstances and different users who execute pick-up and put-back behaviors, therefore, whether a visual identification result is obtained corresponding to a weight change is determined by judging whether there is pick-up and put-back time matching the weight change time or not. The weight change value of the weight identification result can be synchronized with the pick-up and put-back behavior and the pick-up and put-back items of the visual identification result on a time axis, so that the two results can be aligned with the time axis, so as to realize the matching of the weight change time with the pick-up and put-back time. This operation is executed for each weight identification result.

Step 206, if the result of the judgment is no, determining a supplement item according to the weight change value, wherein the supplement item belongs to the sum of identification items.

In this step, due to the weight change, only the weight identification result is acquired, but no corresponding visual identification results are acquired, therefore, if the sum of a plurality of visual identification results is taken as the sum of identification items corresponding to N times of pick-up and put-back behaviors, the accuracy of item identification would be reduced; in order to improve the accuracy of item identification, the items to be sold corresponding to the weight change value are obtained according to the weight change value and the preset weight table, and the items are regarded as the supplement item, which is classified into the sum of identification items corresponding to N times of pick-up and put-back behaviors, thus improving the accuracy of item identification. The weight identification result is used to verify the visual identification result, and the weight identification result that cannot be identified by the visual identification result and the detected gravity change is added to the sum of identification items to complete the secondary verification of the visual identification result.

Step 207, if the result of the judgment is yes, the pick-up and put-back item corresponding to the pick-up and put-back time belongs to the sum of identification items.

In this step, due to the weight change, the weight identification result is acquired, and the visual identification result is also acquired correspondingly, therefore, the visual identification result is considered to be correct, that is, the pick-up and put-back item of the visual identification result belongs to the sum of identification items corresponding to N times of picked-up and put-back behaviors.

Figure 3:
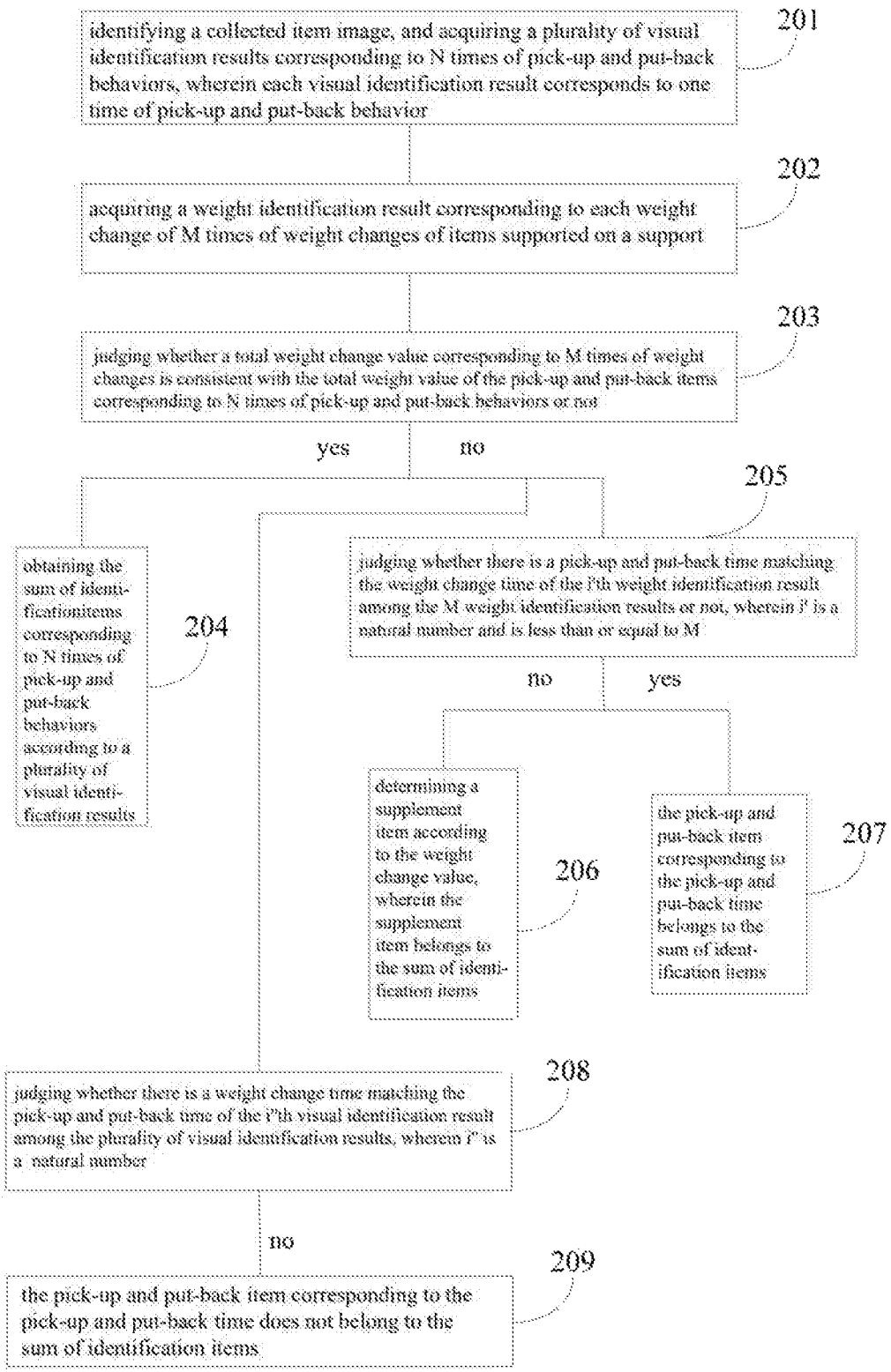
FIG. 3 is a schematic flowchart of an item identification method based on vision and gravity sensing provided in still another example of the present invention.

With reference to FIG. 3, when the pick-up and put-back behaviors are executed, some users may have foreign matters in their hands, which are not the items supported on the support, that is, not belonging to the items to be sold, such as mobile phone, handbag, etc., since the collected item images may contain foreign matters, when identifying, the pick-up and put-back action containing foreign matters may be mistaken as one pick-up and put-back behavior, thereby affecting the sum of final identification items, therefore, after the step 204, the item identification method further comprises the following steps:

Step 208, judging whether there is weight change time matching the pick-up and put-back time of the i"th visual identification result among the plurality of visual identification results, wherein i" is a natural number.

As that visual identification result is acquired by the visual identification technology, therefore, under normal circumstances, if a visual identification effect is acquired, it should be because the user executed the pick-up and put-back behavior, or the pick-up behavior, or the put-back behavior, correspondingly, it would cause the weight carried by the support to change, however, it would be different in different circumstances and different users who execute pick-up and put-back behaviors, therefore, it is determined whether a visual identification result is corresponding to a weight change by judging whether there is the weight change time matching the pick-up and put-back time, that is, a weight identification result is obtained. The weight change value of the weight identification result can be synchronized with the pick-up and put-back action and the pick-up and put-back item of the visual identification result on the time axis, so that the two results can be aligned with the time axis, so as to realize the matching of the weight change time with the pick-up and put-back time. This operation is executed for each weight identification result. The maximum value of i" is the number of visual identification results.

Step 209, if the result of the judgment is no, the pick-up and put-back item corresponding to the pick-up and put-back time does not belong to the sum of identification items.

In this step, since only the visual identification result is acquired but no weight identification result, no weight change occurs at this time, that is, no item is taken from the support or put back on the support, indicating that the items targeted by this pick-up and put-back action do not belong to the items to be sold. Although the visual identification result is obtained, the picked-up and put-back items of the visual identification result are not classified into the sum of identification items, that is, the picked-up and put-back items of the visual identification result need to be deleted from the sum of identification items. The weight identification result is used to verify the visual identification result, and the visual identification result without gravity change is filtered out to complete the secondary verification of the visual identification result.

It should be noted that step 208 may be executed simultaneously with step 205, or may be executed after the step 205, also may be executed before step 205, which is not limited in this example.

In summary, in the examples of the present invention, the visual identification result and the weight identification result are acquired, and when the total weight value corresponding to the visual identification result is inconsistent with the total weight change value corresponding to the weight identification result, the visual identification result is perfected according to the weight identification result, so as to obtain the sum of identification items purchased by the user, thereby improving the accuracy of item identification.

Figure 4:
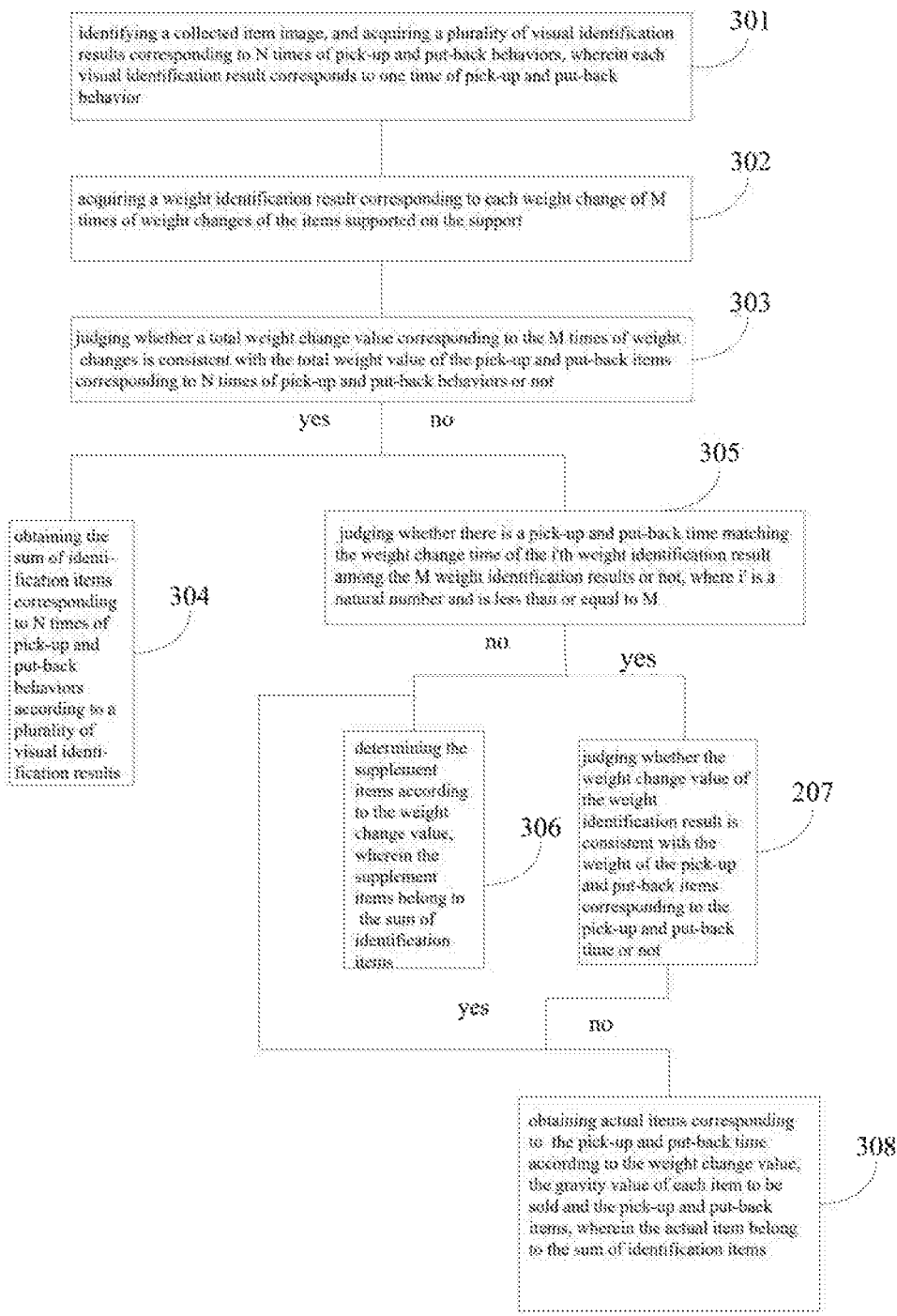
FIG. 4 is a schematic flowchart of an item identification method based on vision and gravity sensing provided in yet another example of the present invention.

With reference to FIG. 4, a further example of present invention provides an item identification method based on vision and gravity sensing, which comprise the steps of:

Step 301, identifying a collected item images, and acquiring a plurality of visual identification results corresponding to N times of pick-up and put-back behaviors, wherein each visual identification result corresponds to one time of pick-up and put-back behavior, the visual identification result includes a pick-up and put-back action, a pick-up and put-back item and pick-up and put-back time, the pick-up and put-back item is the item which corresponds to the pick-up and put-back action.

Step 302, acquiring a weight identification result corresponding to each weight change of M times of weight changes of the item supported on the support, wherein the weight identification result comprises a weight change value and weight change time, and M is a natural number.

Step 303, judging whether a total weight change value corresponding to the M times of weight changes is consistent with the total weight value of the pick-up and put-back items corresponding to N times of pick-up and put-back behaviors or not.

Step 304, if it is judged to be consistent, obtaining the sum of identification items corresponding to N times of pick-up and put-back behaviors according to a plurality of visual identification results.

Step 305, if it is judged to be inconsistent, judging whether there is pick-up and put-back time matching the weight change time of the i'th weight identification result among the M weight identification results or not, wherein i' is a natural number and is less than or equal to M.

Step 306, if the result of the judgment is no, determining the supplement items according to the weight change value, wherein the supplement items belong to the sum of identification items.

The descriptions of steps 301 to 306 refer to the related descriptions of the above examples, and are not repeated herein.

Step 307, if the result of the judgment is yes, judging whether the weight change value of the weight identification result is consistent with the weight of the pick-up and put-back items corresponding to the pick-up and put-back time or not.

In this step, if there is pick-up and put-back time matching the weight change time, both the weight identification result and the visual identification result are acquired, indicating that the pick-up and put-back action of the pick-up and put-back behavior is for the items to be sold. In some circumstances, for example, if the users take a plurality of items at a time, the items may be shielded from each other, which would affect the accuracy of the visual identification result acquired based on the image identification technology, at this time, the pick-up and put-back items of the visual identification result are not the items actually taken by the user, and if the identified pick-up and put-back item is D, the item actually taken by the user is C, that is, the actual item C is identified as item D, and if the item D is classified to the sum of identification items, the user's experience of unmanned shopping would be affected when checking out, therefore, in order to improve the user's shopping experience and the accuracy of item identification, the step is executed.

Step 308, if it is judged to be inconsistent, obtaining actual items corresponding to the pick-up and put-back time according to the weight change value, the gravity value of each item to be sold and the pick-up and put-back items, wherein the actual item belongs to the sum of identification items.

Although both the weight identification result and the visual identification result are obtained, in a circumstance such as the described above, the weight change value of the weight identification result is inconsistent with the gravity value of the pick-up and put-back items of the visual identification result, the actual item corresponding the pick-up and put-back time is obtained according to the weight change value, the gravity value of each item to be sold and the pick-up and put-back items, the actual item belongs to the sum of identification items, and the pick-up and put-back items of the visual identification result do not belong to the sum of identification items at this time.

Alternatively, if only one weight prediction result based on the weight change value and the gravity value of each item to be sold is obtained, and the weight prediction result includes the weight prediction item, thus the weight prediction item is taken as the actual item corresponding to the pick-up and put-back time. If the weight change value is G, with G as the limiting condition, the items to be sold are combined so that total weight of which is consistent with G and only one combination is obtained, the item constituting the combination is called a weight prediction item, which is taken as the actual item corresponding to the pick-up and put-back time, the actual item belongs to the sum of identification items, and at this time, the pick-up and put-back items of the visual identification result do not belongs to the sum of identification items. G is a positive number.

Alternatively, if a plurality of weight prediction results are obtained according to the weight change value and the gravity value of each item to be sold, the weight prediction result with the highest coincidence degree with the pick-up and put-back items of the visual identification result in the plurality of weight prediction result is taken as the actual items corresponding to the pick-up and put-back time. The coincidence degree refers to that there are the same items in the weight prediction item of the weight prediction result and the pick-up and put-back items in the visual identification result, that is, the two have intersection, in other words, the weight prediction items of the weight prediction result closest to the pick-up and put-back items in the visual identification result are taken as the actual items corresponding to the pick-up and put-back time.

Alternatively, if the pick-up and put-back items in the visual identification result belong to multi-specification items, which are the items with the same appearance and different weights, such as colas with different specifications, the item type is determined according to the pick-up and put-back item, and the item specification of the pick-up and put-back item is determined according to the determined the item type and the gravity values of the items to be sold, and the item specification is attributed to the pick-up and put-back items, and then the pick-up and put-back item is updated, the pick-up and put-back item comprises the item types and the item specifications at the moment, so that diversification can be achieved on selected items to be sold, and the goodness of user's experience can be improved.

Step 309, if the judgment result is consistent, skipping to step 306.

In this step, if the weight identification result is obtained and also the visual identification result is obtained, and the corresponding weight change value and the weight value are consistent, the visual identification result is considered to be correct, and then skip to 306, and the pick-up and put-back items of the visual identification result are assigned to the sum of identification items corresponding to N times of pick-up and put-back behaviors.

The description of step 306 refers to the related descriptions of the above example, and is not repeated here.

In summary, in the examples of the present invention, the visual identification result and the weight identification result are obtained, and when the total weight value corresponding to the visual identification result is inconsistent with the total weight change value corresponding to the weight identification result, the visual identification result is perfected according to the weight identification result, so as to obtain the sum of identification items purchased by the user, thereby improving the identification accuracy of the items.

Figure 5:
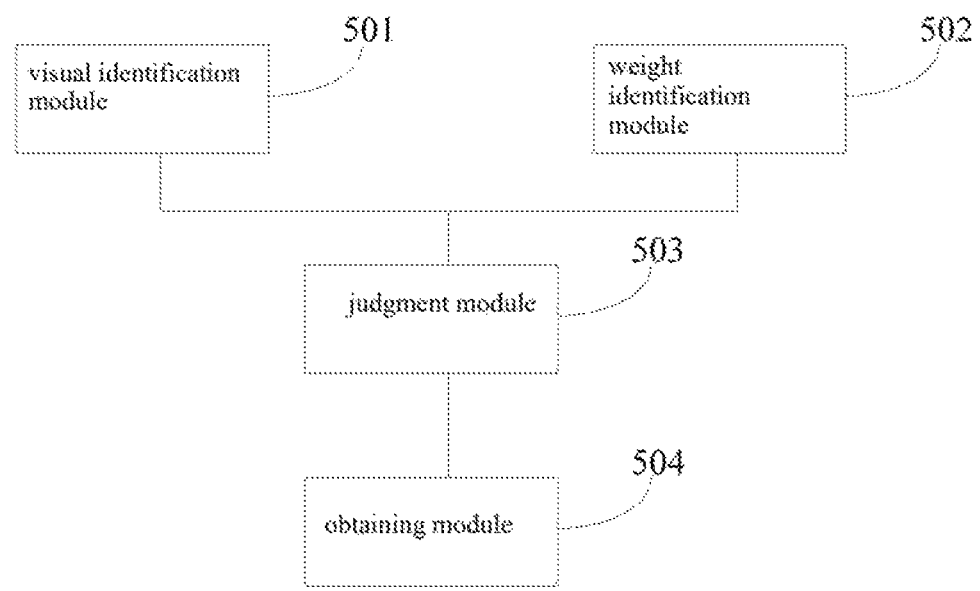
FIG. 5 is a structural schematic diagram of an item identification method based on vision and gravity sensing provided in an example of the present invention.

With reference to FIG. 5, The example of present invention provides an item identification device based on vision and gravity sensing, which has the function of realizing the example of the above-mentioned method, and the function can be realized by hardware and can also be realized by hardware executing corresponding software. The item identification device comprises: a visual identification module 501, a weight identification module 502, a judgment module 503 and an obtaining module 504.

The visual identification module 501 is used to identify a collected item images, and obtain a plurality of visual identification results corresponding to N times of pick-up and put-back behaviors, wherein each visual identification result corresponds to one time of pick-up and put-back behavior, the visual identification result includes the pick-up and put-back action, the pick-up and put-back item and the pick-up and put-back time, and N is a natural number. The weight identification module 502 is used to acquire a weight identification result corresponding to each weight change of M times of weight changes of items supported on the support, wherein the weight identification result comprises the weight change value and the weight change time, and M is a natural number. The judgment module 503 is used to judge whether the total weight change value corresponding to M times of weight changes is consistent with the total weight value of the pick-up and put-back items corresponding to N times of pick-up and put-back behaviors or not. The obtaining module 504 is used to perfect each visual identification result according to the M weight identification results to obtain the sum of identification items corresponding to N times of pick-up and put-back behaviors if the result of the judgment is inconsistent.

Alternatively, the obtaining module comprises: a first judgment unit, a supplement unit, a confirmation unit and a first traversal unit. The first judging unit is used to judge whether the pick-up and put-back time matched with the weight change time of the weight identification result exists or not. The supplement unit is used to determine a supplement item according to the weight change value if the result of the first judging unit is 'the pick-up and put-back time matched with the weight change time of the weight identification result does not exist', the supplement item belongs to the sum of the identified items. The confirmation unit is used to, if the result of the first judging unit is 'exist', the pick-up and put-back item corresponding to the pick-up and put-back time belongs to the sum of identification items. The first traversal unit is used to perform respective functions of the first judgment unit, the supplement unit and the confirmation unit for each of the weight identification results.

Alternatively, the item identification device also comprises: a second judgment unit used to judge whether the weight change value of the weight identification result is consistent with a weight of the pick-up and put-back item corresponding to the pick-up and put-back time or not, if the result of the first judgment unit is 'the pick-up and put-back time matched with the weight change time of the weight identification result exists'. The actual item confirmation unit is used to obtain actual items corresponding to the pick-up and put-back time according to the weight change value, the gravity value of each item to be sold and the pick-up and put-back items, if the result of the second judgment unit is inconsistent, wherein the actual item belongs to the sum of identification item; The skip unit is used to, if the result of the second judgment unit is consistent, execute the function of the confirmation unit that the pick-up and put-back items corresponding to the pick-up and put-back time belong to the sum of identification items.

Alternatively, the item identification further comprises: a third judgment unit, a deletion unit and a second traversal unit. The third judgment unit is used to judge whether weight change time matched with the pick-up and put-back time of the visual identification result exists or not. The deletion unit is used to, if the result of the third judgment unit is 'weight change time matched with the pick-up and put-back time of the visual identification result does not exist', the pick-up and put-back items corresponding to the pick-up and put-back time do not belong to the sum of the identification items. The second traversal unit is used to perform respective functions of the third judgment unit and the deletion unit for each of the visual identification results.

Alternatively, the item identification device comprises: an image pre-process module used for carrying out background separation processing on the collected item image to obtain a foreground image of the item image, and the foreground image is used as an item image for identification.

In summary, in the examples of the present invention, the visual identification result and the weight identification result are obtained, and when the total weight value corresponding to the visual identification result is inconsistent with the total weight change value corresponding to the weight identification result, the visual identification result is perfected according to the weight identification result, so as to obtain the sum of the identification items purchased by the user, thereby improving the identification accuracy of the items.

An example of present invention provides an item identification system based on vision and gravity sensing, which comprises: a camera device (also called image acquisition device) used for acquiring the item images; a weighing device used for weighing the weight of a container for selling goods; and a item identification device connected with the camera device and the weighing device, which is the item identification device mentioned above.

An example of present invention provides an item identification device based on vision and gravity sensing, which comprises: a memory and a processor. The processor is connected with the memory and is configured to execute the above-mentioned item identification method based on vision and gravity sensing based on the instructions stored in the memory.

An example of present invention provides a computer-readable storage medium having stored thereon a computer program which, when executed by a processor, realizes the above-mentioned item identification method based on vision and gravity sensing.

It can be known from common technical knowledge that the present invention can be implemented by other embodiments without departing from the spirit essence or necessary characteristics of the present invention. Therefore, the above-mentioned disclosed embodiments, in all aspects, merely are used for illustration rather than limitation. All changes made in the scope of the present invention or the scope equivalent to the present invention shall fall within the present invention.

What is claimed is:

1. An item identification method based on vision and gravity sensing comprising:

identifying a collected item image, and acquiring a plurality of visual identification results corresponding to N times of pick-up and put-back behaviors, wherein each visual identification result corresponds to one time of pick-up and put-back behavior, the visual identification result includes a pick-up and put-back action, a pick-up and put-back item and pick-up and put-back time, and N is a natural number;

acquiring a weight identification result corresponding to each weight change of M times of weight changes of items supported on a support, wherein the weight identification result comprises a weight change value and weight change time, and M is a natural number;

judging whether a total weight change value corresponding to M times of weight changes is consistent with the total weight value of the pick-up and put-back items corresponding to the N times of pick-up and put-back behaviors or not; and if not, perfecting each visual identification result according to the M weight identification results to obtain a sum of identification items corresponding to the N times of pick-up and put-back behaviors.

2. The item identification method according to claim 1, wherein each of the visual identification results is perfected according to the M weight identification results to obtain the sum of identification items corresponding to the N times of pick-up and put-back behaviors comprises:

performing the following operations for each of the weight identification results:
judging whether the pick-up and put-back time matched with the weight change time of the weight identification result exists or not;
if not, determining a supplement item according to the weight change value, wherein the supplement item belongs to the sum of identification items;
if yes, the pick-up and put-back item corresponding to the pick-up and put-back time belongs to the sum of identification items.

3. The item identification method according to claim 2, wherein if yes, the item identification method further comprises:

judging whether the weight change value of the weight identification result is consistent with a gravity value of the pick-up and put-back item corresponding to the pick-up and put-back time;
if not, obtaining an actual item corresponding to the pick-up and put-back time according to the weight change value, the gravity value of each item to be sold and the pick-up and put-back items, wherein the actual item belongs to the sum of identification items;
if yes, skipping to the step that the pick-up and put-back item corresponding to the pick-up and put-back time belongs to the sum of identification items.

4. The item identification method according to claim 2, wherein each visual identification result is perfected according to the M weight identification results to obtain the sum of identification items corresponding to the N times of pick-up and put-back behaviors further comprising:

performing the following operations for each of the visual identification results:
judging whether the weight change time matched with the pick-up and put-back time of the visual identification result exists or not;
if not, the pick-up and put-back item corresponding to the pick-up and put-back time does not belong to the sum of identification items.

5. The item identification method according to claim 1, wherein identifying the collected item image comprises:

carrying out background separation processing on the collected item image to obtain a foreground image of the item image;
identifying the foreground image.

6. An item identification device based on vision and gravity sensing comprising:

a visual identification module used to identify a collected item image, and acquire a plurality of visual identification results corresponding to N times of pick-up and put-back behaviors, wherein each visual identification result corresponds to one time of pick-up and put-back behavior, the visual identification result includes a pick-up and put-back action, a pick-up and put-back item and pick-up and put-back time, and N is a natural number;

a weight identification module used to acquire a weight identification result corresponding to each weight change of M times of weight changes of items supported on a support, wherein the weight identification result comprises a weight change value and weight change time, and M is a natural number;

a judgment module used to judge whether a total weight change value corresponding to M times of weight changes is consistent with the total weight value of the pick-up and put-back items corresponding to the N times of pick-up and put-back behaviors or not; and an obtaining module used to perfect each visual identification result according to the M weight identification results to obtain a sum of identification items corresponding to the N times of pick-up and put-back behaviors if the result of the judgment is inconsistent.

7. The item identification device according to claim 6, wherein the obtaining module comprises:

a first judgment unit used to judge whether the pick-up and put-back time matched with the weight change time of the weight identification result exists or not;
a supplement unit used to determine a supplement item according to the weight change value if the result of the first judgment unit is 'the pick-up and put-back time matched with the weight change time of the weight identification result does not exist', wherein the supplement item belongs to the sum of identification items;
a confirmation unit used to, if the result of the first judgment unit is 'the pick-up and put-back time matched with the weight change time of the weight identification result exists', the pick-up and put-back item corresponding to the pick-up and put-back time belongs to the sum of identification items; and
a first traversal unit used to perform the respective functions of the first judgment unit, the supplement unit and the confirmation unit for each of the weight identification results.

8. The item identification device according to claim 7, comprising:

a second judgment unit used to judge whether the weight change value of the weight identification result is consistent with a weight of the pick-up and put-back item corresponding to the pick-up and put-back time or not, if the result of the first judgment unit is 'the pick-up and put-back time matched with the weight change time of the weight identification result exists';
an actual item confirmation unit used to obtain an actual item corresponding to the pick-up and put-back time according to the weight change value, a gravity value of each item to be sold and the pick-up and put-back item, if the result of the second judgment unit is 'the weight change value of the weight identification result is inconsistent with a weight of the pick-up and put-back item corresponding to the pick-up and put-back time', wherein the actual item belongs to the sum of identification items; and
a skip unit used to, if the result of the second judgment unit is 'the weight change value of the weight identification result is consistent with a weight of the pick-up and put-back item corresponding to the pick-up and put-back time', execute the function of the confirmation unit that the pick-up and put-back item corresponding to the pick-up and put-back time belongs to the sum of the identification items.

9. The item identification device according to claim 7, further comprising:
- a third judgment unit used to judge whether the weight change time matched with the pick-up and put-back time of the visual identification result exists or not;
- a deletion unit used to, if the result of the third judgment unit is 'the weight change time matched with the pick-up and put-back time of the visual identification result does not exist', the pick-up and put-back item corresponding to the pick-up and put-back time does not belong to the sum of identification items;
- a second traversal unit used to perform the respective functions of the third judgment unit and the deletion unit for each of the visual identification results.

10. An item identification system based on vision and gravity sensing, comprising:
- an image collection device used to collect item images;
- a weighing device used to weigh the weight of a container for selling items;
- an item identification device according to claim 6, connected with the image collection device and the weighing device.

\* \* \* \* \*